US006915072B2

(12) United States Patent
Takahashi et al.

(10) Patent No.: US 6,915,072 B2
(45) Date of Patent: Jul. 5, 2005

(54) FINDER, MARKER PRESENTATION MEMBER, AND PRESENTATION METHOD OF POSITIONING MARKER FOR CALIBRATION PHOTOGRAPHY

(75) Inventors: Kazuhiko Takahashi, Hachioji (JP); Akio Kosaka, Hachioji (JP); Kazuhiko Arai, Hachioji (JP); Takashi Miyoshi, Atsugi (JP); Hidekazu Iwaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/688,740

(22) Filed: Oct. 17, 2003

(65) Prior Publication Data

US 2004/0136706 A1 Jul. 15, 2004

(30) Foreign Application Priority Data

Oct. 23, 2002 (JP) ........................ 2002-308640

(51) Int. Cl.[7] .................. G03B 13/02; H04N 17/00
(52) U.S. Cl. .................. 396/296; 396/374; 348/188; 348/333.03
(58) Field of Search ................... 348/187, 188, 348/341, 333.01–333.04; 396/296, 374

(56) References Cited

U.S. PATENT DOCUMENTS

| | | | |
|---|---|---|---|
| 4,011,571 A | 3/1977 | Okuzawa | 396/291 |
| 4,837,633 A | 6/1989 | Parra | 348/333.03 |
| 5,233,381 A | 8/1993 | Abe | 396/379 |
| 5,664,235 A | 9/1997 | Ohmura et al. | 396/71 |
| 5,808,678 A | 9/1998 | Sakaegi | 348/333.03 |
| 5,873,007 A | 2/1999 | Ferrada Suarez | 396/296 |
| 5,940,642 A * | 8/1999 | Ishiguro | 396/378 |
| 6,184,930 B1 * | 2/2001 | Mitsuhashi et al. | 348/333.01 |
| 6,366,740 B1 | 4/2002 | Procopio | 396/316 |
| 6,734,899 B1 * | 5/2004 | Okamoto | 348/188 |
| 6,750,914 B2 * | 6/2004 | Sannoh et al. | 348/346 |

FOREIGN PATENT DOCUMENTS

| | | | |
|---|---|---|---|
| DE | 35 17 202 A1 | 11/1986 | G03B/37/04 |
| DE | 100 49 926 A1 | 4/2002 | G03B/37/02 |
| FR | 2 632 425 | 12/1989 | G03B/35/06 |
| GB | 564302 | 6/1943 | |
| GB | 867465 | 5/1961 | |
| GB | 1127697 | 9/1968 | |
| JP | 52-34244 * | 8/1951 | |
| JP | 9-22045 | 1/1997 | G03B/13/02 |
| JP | 11-218820 * | 8/1999 | G03B/17/02 |
| JP | 2001-133225 * | 5/2001 | G01B/11/02 |
| JP | 2002-202122 | 7/2002 | G01C/3/06 |
| JP | 2002-213929 * | 7/2002 | G01B/11/24 |
| JP | 2002-218501 | 8/2002 | H04N/13/00 |
| JP | 3353737 | 9/2002 | G01B/11/25 |
| JP | 2002-290780 | 10/2002 | H04N/5/225 |

OTHER PUBLICATIONS

English translation of communication from Japanese Patent Office dated Mar. 22, 2005.*

* cited by examiner

Primary Examiner—W. B. Perkey
(74) Attorney, Agent, or Firm—Scully, Scott, Murphy & Persser

(57) ABSTRACT

A finder apparatus which is used together with a photographing apparatus presents a marker for positioning for setting relative positions of the photographing apparatus and an object for calibration so as to be visually recognizable by an operator in a finder configured to present an image of a subject so as to be visually recognizable by the operator, when photographing the object for calibration including at least one of a known shape and a known surface attribute in order to acquire parameters of a photographing optical system of the photographing apparatus.

25 Claims, 10 Drawing Sheets

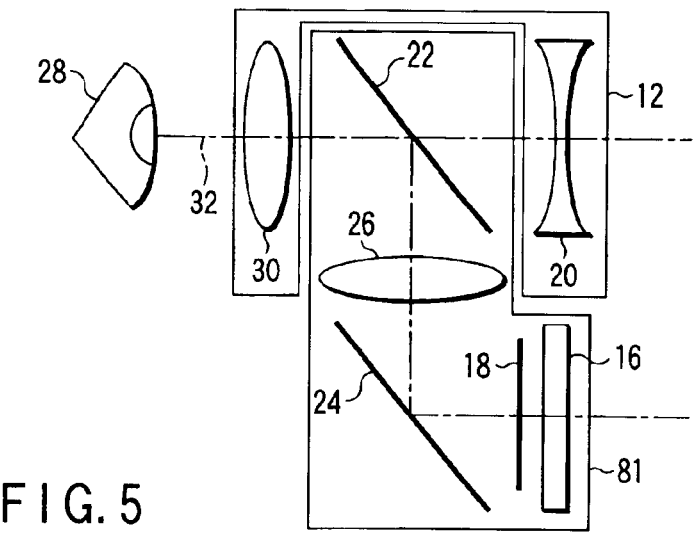
F I G. 5
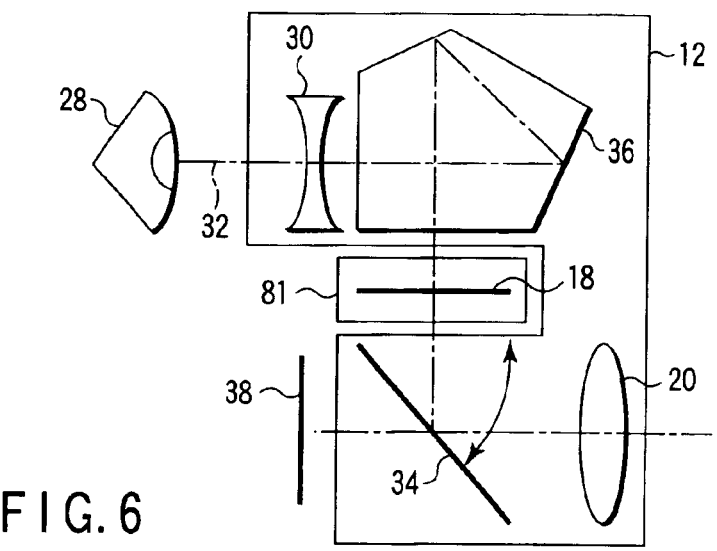
F I G. 6
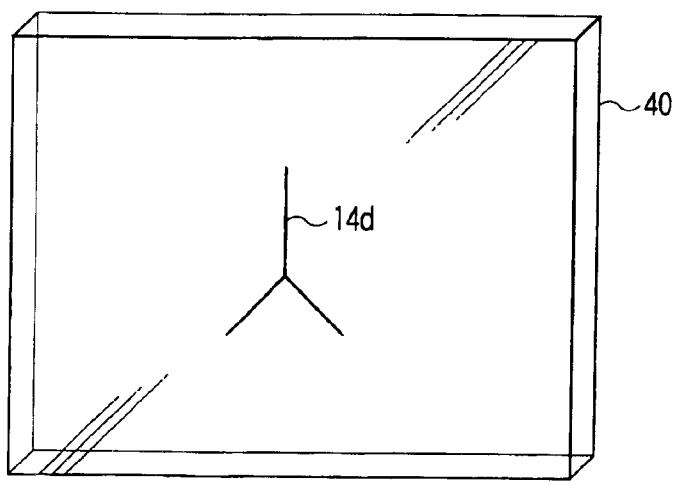
F I G. 7

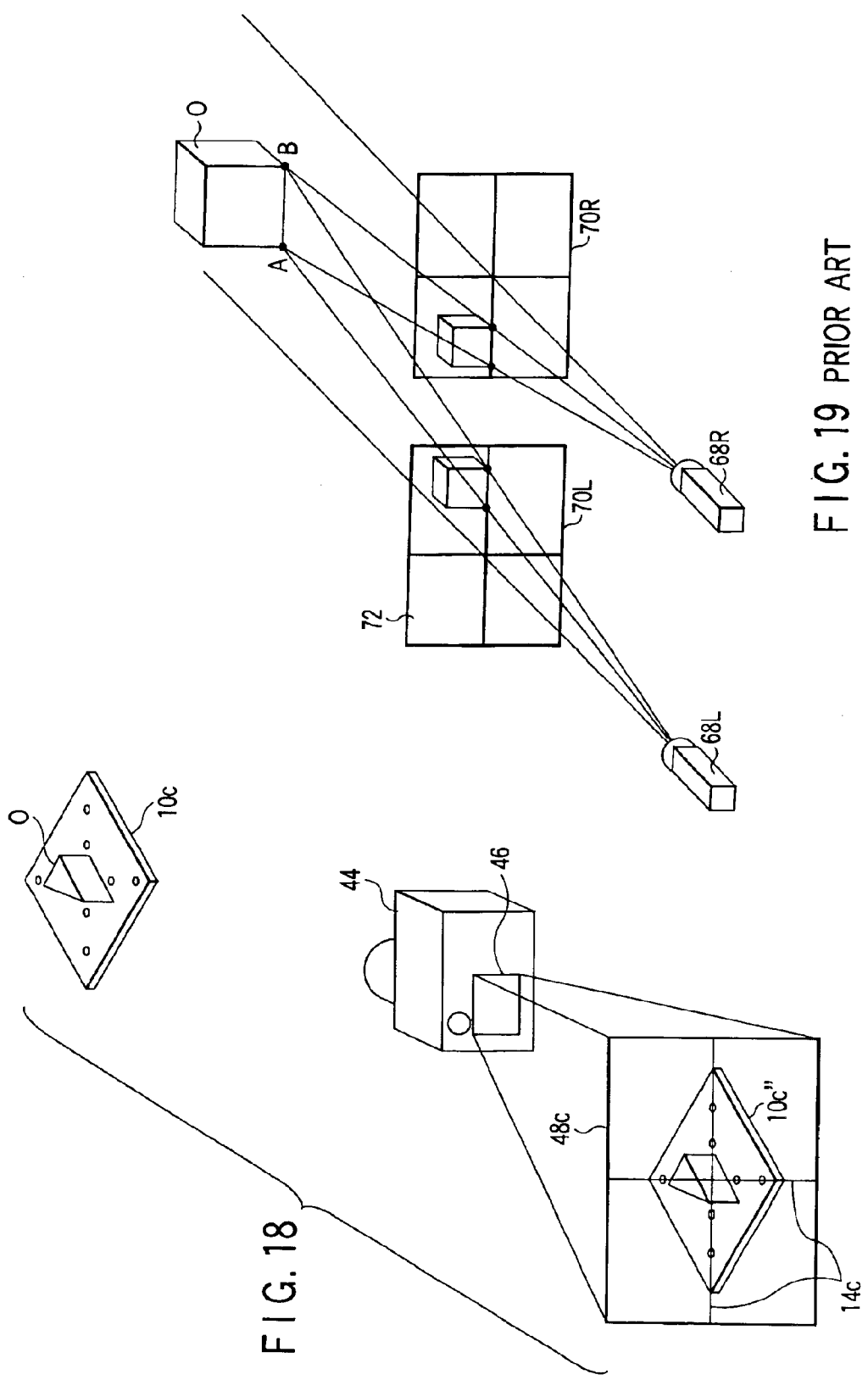

FINDER, MARKER PRESENTATION MEMBER, AND PRESENTATION METHOD OF POSITIONING MARKER FOR CALIBRATION PHOTOGRAPHY

CROSS-REFERENCE TO RELATED APPLICATIONS

This application is based upon and claims the benefit of priority from the prior Japanese Patent Application No. 2002-308640, filed Oct. 23, 2002, the entire contents of which are incorporated herein by reference.

BACKGROUND OF THE INVENTION

1. Field of the Invention

The present invention relates to a finder suitable for use in photographing an object whose shape or surface attribute is known in order to acquire a camera parameter, a marker presentation member, and a presentation method of a positioning marker for calibration photography.

2. Description of the Related Art

To carry out correct three-dimensional measurement, a calibration board (pattern) whose shape is known has heretofore been photographed to calculate an inner parameter of an optical system. As one example, in Jpn. Pat. Appln. KOKAI Publication No. 2002-202122, a mode has been proposed in which the calibration board (pattern) and the optical system are disposed on the same parallel rails to maintain predetermined relative positions when photographing the calibration board (pattern).

BRIEF SUMMARY OF THE INVENTION

According to a first aspect of the present invention, there is provided a finder apparatus which is used together with a photographing apparatus, comprising:

a finder configured to present an image of a subject so as to be visually recognizable by an operator; and positioning marker presentation member configured to present a marker for positioning for setting relative positions of the photographing apparatus and an object for calibration to the finder so as to be visually recognizable by the operator, when the object for calibration including at least one of a known shape and a known surface attribute is photographed to acquire a parameter of a photographing optical system of the photographing apparatus.

According to a second aspect of the present invention, there is provided a marker presentation member comprising one of:

a member through which a visible light is transmitted and on which a marker for positioning is partially disposed to set relative positions of a photographing apparatus and an object for calibration including one of a known shape and surface attribute; and a member including the marker for positioning, wherein the one of the member on which the marker for positioning is disposed and the member including the marker for positioning is disposed on an optical path of a light which guides the image of the object for calibration into the operator's eyes, when photographing the object for calibration in order to acquire parameters of a photographing optical system of the photographing apparatus.

According to a third aspect of the present invention, there is provided a method for presenting a marker for positioning for calibration photography, comprising:

presenting an image of an object for calibration in a finder which guides the image photographed by a photographing apparatus into operator's eyes so as to be visually recognizable by an operator, when photographing the object for calibration whose one of shape and surface attribute is known in order to acquire parameters of a photographing optical system of the photographing apparatus; and presenting a marker for positioning to set relative positions of the photographing apparatus and the object for calibration in the finder so as to be visually recognizable by the operator.

According to a fourth aspect of the present invention, there is provided a finder apparatus which is used together with a photographing apparatus, comprising:

a finder for presenting an image of a subject so as to be visually recognizable by an operator; and positioning marker presentation means for presenting a marker for positioning for setting relative positions of the photographing apparatus and an object for calibration to the finder so as to be visually recognizable by the operator, when the object for calibration including at least one of a known shape and a known surface attribute is photographed to acquire a parameter of a photographing optical system of the photographing apparatus.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a diagram showing a structure example of the finder in a two-lens system in the first embodiment;

FIG. 6 is a diagram showing a structure example of the finder in a single lens reflex system in the first embodiment;

FIG. 7 is a diagram showing a panel as a marker presentation member according to the first embodiment;

FIG. 18 is a diagram showing the photographing situation of the calibration pattern by the photographing system which is the photographing apparatus according to a ninth embodiment of the present invention;

FIG. 19 is a concept diagram of stereo photography;

DETAILED DESCRIPTION OF THE INVENTION

First an object for calibration whose shape and/or surface attribute is known will be described prior to detailed description of embodiments of the present invention.

Figure 1:
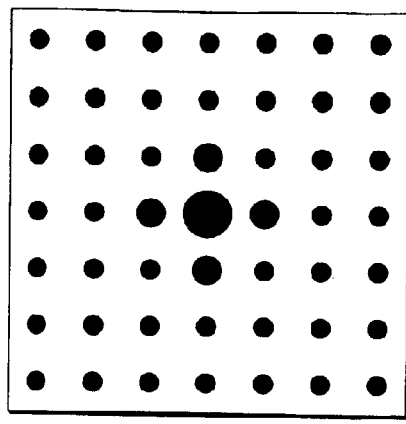
FIG. 1 is a diagram showing an example of an object for calibration.

As the object for calibration, a plate-shaped object in which a known geometrical pattern is described can be used. For example, the object for calibration shown in FIG. 1 (hereinafter referred to as a calibration pattern 10a) can be used. In this example, three types of large, medium, and small black circles are drawn at constant equal intervals and with a certain rule. These intervals and rule depend on algorithm of calibration, required photographing system correction information, and the like, and can arbitrarily be selected, and are not limited in the present invention. For example, the black circles may be replaced with cross marks, or double circles constituted of white and black. Instead of distinction with the size of the black circle, distinction may also be made with color information.

In the present specification, the terms "object for calibration" and "calibration pattern" mean an object that is known in terms of at least shape or surface attribute. The size of the object need not be known, depending on the parameter to obtain. The term "surface attribute" is not limited to such a geometrical pattern. It may mean also the color or pattern data of the surface of the object. The surface pattern may be defined by holes made in or other objects bonded to the surface of the object. The other objects are of a color or colors different from that of the object.

Furthermore, as the object for calibration, the above-described plate-shaped objects may also be combined. For example, the object for calibration shown in FIG. 2 (hereinafter referred to as a calibration pattern 10b) can be constituted. It is to be noted that in this figure the known geometrical pattern is constituted of the cross mark, but needless to say, the above-described other patterns may also be used.

The object for calibration (calibration pattern 10a or 10b) is photographed, and internal parameters of an optical system such as lens strain information can be acquired from the obtained image. Moreover, when predetermined image correction is performed based on the acquired lens strain information, it is possible to acquire, for example, an image from which lens strain is removed.

Figure 3A:
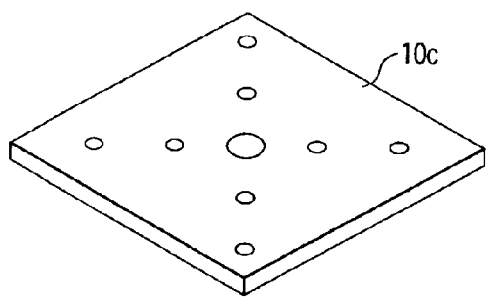
FIG. 3A is a diagram showing another example of a calibration pattern.
Figure 3B:
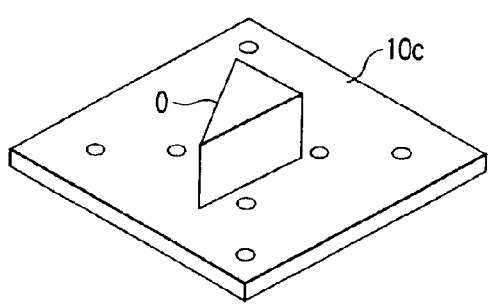
FIG. 3B is a diagram showing that an object to be photographed is disposed on the calibration pattern shown in FIG. 3A.

Moreover, when an object to be photographed is photographed, as shown in FIG. 3B, an object to be photographed O is disposed on a calibration pattern 10c shown in FIG. 3A, and photographed to acquire various parameters. In this manner, the photographing of the calibration pattern in a system for acquiring information from an image has also broadly been performed.

Embodiments of the present invention will hereinafter be described with reference to the drawings.

[First Embodiment]

The present embodiment is an example in which a marker for positioning is presented to appropriately set relative positions of a photographing apparatus and the object for calibration in a finder. It is to be noted that in the present specification, an apparatus for guiding the image of a subject into operator's eyes so that a photographing range can be presented to an operator is referred to as the finder. In addition to the optical finder, a so-called electronic finder for presenting the photographing range to the operator via electric apparatuses such as LCD is also included. Furthermore, in the present specification, the term "image" means an optical image and/or electronic image.

Figure 4:
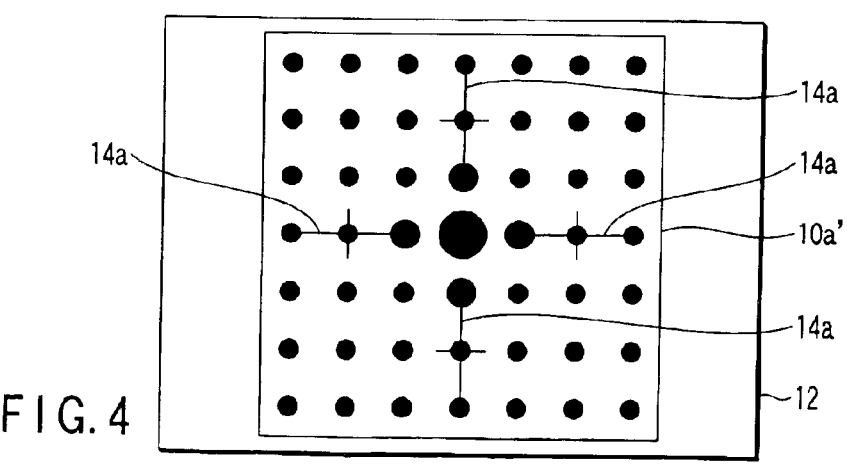
FIG. 4 is a diagram showing an optical finder of a photographing apparatus as a first embodiment of the finder of the present invention.

That is, to acquire various parameters of a photographing optical system of the photographing apparatus, the calibration pattern which is the object for calibration having the known shape or surface attribute is photographed by the photographing apparatus. At this time, in a finder 12 of the photographing apparatus, as shown in FIG. 4, the marker for positioning (markers for positioning 14a in this example) with respect to the calibration pattern for use (the calibration pattern 10a shown in FIG. 1 in this example) is presented so as to be visually recognizable. Therefore, as shown in FIG. 4, a photographing person who looks into the finder 12 sees the image of the calibration pattern (calibration pattern image 10a' in this example) superimposed upon the markers for positioning (markers for positioning 14a).

As a method of presenting the marker for positioning, a presentation method by the optical superimposition of images is proposed. An example of this optical image superimposition will be described with reference to FIGS. 5 and 6.

In the photographing apparatus of a two-lens system, as shown in FIG. 5, an outside light taken in via a diffusion plate 16 passes through a glass plate 18, which is a member analogous to the markers for positioning (e.g., markers for positioning 14a) and constitutes a marker image production section, to produce an image of the marker for positioning. The image of the marker for positioning passes through a mirror 24 and optical path adjustment lens 26, and is superimposed upon the image of the subject from an objective lens 20 by a half mirror 22 as an image superimposition section. Moreover, the superimposed image enters user's eye 28 via an eyepiece lens 30. In this manner, the glass plate 18 which is the member analogous to the marker for positioning is disposed on an optical path 32 of a light, for guiding the image of the subject into the operator eye 28, and accordingly the marker for positioning can be presented. Therefore, the diffusion plate 16, the glass plate 18, the half mirror 22, the mirror 24 and optical path adjustment lens 26 constitute a positioning marker presentation member 81.

Moreover, in a single lens reflex photographing apparatus, as shown in FIG. 6, the image of the subject from the objective lens 20 is reflected by a movable mirror 34, passes through the glass plate 18 which is the member analogous to the marker for positioning (e.g., the markers for positioning 14a), and is superimposed upon the image of the marker for positioning. Furthermore, the superimposed image passes through a prism 36 and the eyepiece lens 30 and enters the user's eye 28. In this manner, even in the single lens reflex photographing apparatus, the glass plate 18 which is the member analogous to the marker for positioning is disposed on the optical path 32 of the light, for guiding the image of the subject into the operator's eye 28, and accordingly the marker for positioning can be presented. Provided on the optical path 32, the glass plate 18 functions as a positioning marker presentation member 81 that works as a marker image production section and an image superimposition section. It is to be noted that reference numeral 38 in FIG. 6 is an image pickup device.

Since a user may use the marker for positioning (e.g., the markers for positioning 14a) as a clue to photograph calibration pattern (e.g., the calibration pattern 10a), it is easy to grasp the calibration pattern in an appropriate view field of the photographing apparatus. It is also possible to calculate a substantial distance between the photographing apparatus and the calibration pattern from a relation between the calibration pattern and the marker for positioning during the positioning. Furthermore, a plurality of places (e.g., the pattern of the calibration pattern image 10a' superposed upon a cross portion of the markers for positioning 14a in FIG. 4) where the calibration pattern is positioned with the marker for positioning are set. Accordingly, the calibration pattern can easily be photographed from a plurality of distances.

It is to be noted that in the known photographing apparatus (camera), an auto focus frame and a photographing range frame are presented on the finder. However, the former indicates a range in focus (place to be focused), and the latter indicates an actually photographed range. Therefore, since the marker for positioning does not follow the object (the known shape of the object for calibration, arrangement of patterns) in the finder of the present embodiment, the marker cannot be used for the positioning.

It is to be noted that, needless to say, it is possible to variously modify/change each constitution of the present embodiment. For example, instead of taking in the outside light from the diffusion plate 16, the marker for positioning may be presented in a self-luminous system in which LED, and the like are used as a light source, or a transmission type LCD, and the like may also be used instead of the glass plate 18. Marker images may also be images of a plurality of LED. When the LED or transmission type LCD is turned on/off, or the optical path 32 for guiding the marker image into the photographer's eye 28 is cut off, the image of the marker for positioning can be brought in a display/non-display state, or can be allowed to blink.

Alternatively, the marker for positioning may also be drawn or printed on the front surface or the back surface of the finder 12 so as to be visually recognizable. A film or panel 40 on which the marker for positioning (a marker for positioning 14d corresponding to the calibration pattern 10b shown in FIG. 2 in this example) shown in FIG. 7 is disposed and through which the visible light is transmitted may be attached to the finder 12 so that the marker for positioning is visually recognizable. Alternatively, a configuration of a thin seal through which the visible light is transmitted may also be provided and attached to the finder 12.

Figure 8A:
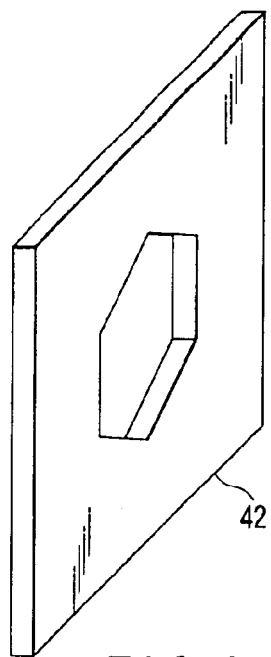
FIG. 8A is a perspective view of a perforated member.
Figure 8B:
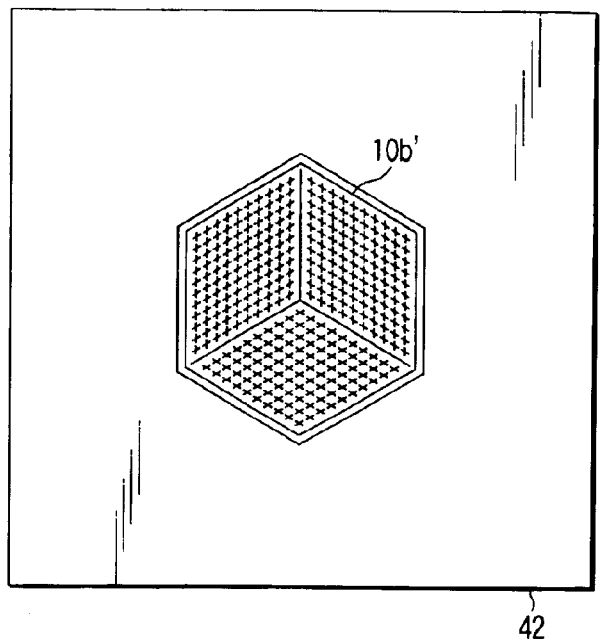
FIG. 8B is a front view of the perforated member shown in FIG. 8A.

Alternatively, as shown in FIGS. 8A and 8B, a perforated member 42 as the marker for positioning through which the visible light is transmitted may also be attached to the finder 12 in accordance with the shape or the surface attribute of the object for calibration (calibration pattern (calibration pattern 10b shown in FIG. 2 in this example)). In this case, the object for calibration may be photographed so that the image of the object (calibration pattern image 10b' in this example) is within a view field range. When at least an outer frame of the view field can be recognized, the positioning is possible even in a state in which the marker is not completely visually focused. Therefore, as compared with a case in which a member including a linear marker as shown in FIGS. 9A to 9E is attached, there is an advantage that limitation of an attaching position is loose.

Moreover, when the photographing apparatus includes an electronic finder having a function of a monitor for confirming the image except the finder 12, the marker for positioning may also be disposed only on the finder 12. In this constitution, the marker does not constitute any hindrance, when the once photographed image is confirmed or when a purpose of the photography is not the calibration.

Figure 9A:
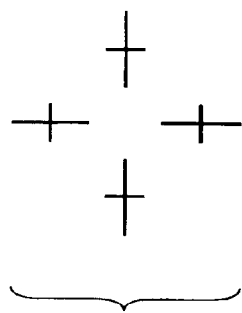
FIGS. 9A to 9E are diagrams showing shape examples of positioning markers.
Figure 9B:
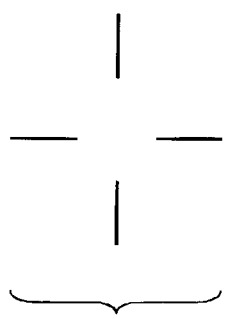
Figure 9C:
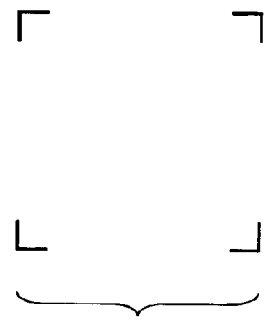
Figure 9D:
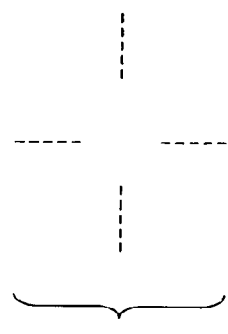
Figure 9E:
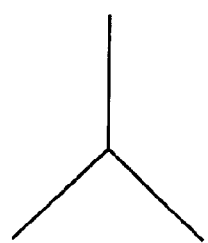

Furthermore, the shape of the marker for positioning does not have to be a linear shape shown in FIG. 4. For example, as shown in FIGS. 9A to 9E, any mark may also be used, as long as the mark is a clue to the photographing of the calibration pattern. That is, as the marker for positioning, line segments, intersecting line segments, points, curves, intersecting curves, or closed curves are disposed, and the followings are considered:

a marker indicating a closed region corresponding to a contour of the image of the calibration pattern shown in the finder in a state in which the relative positions of the photographing apparatus and the object for the calibration pattern are appropriately set;

a marker indicating at least a corner position of the closed region corresponding to the contour of the image of the calibration pattern displayed in the finder, or surrounding an outer edge of the closed region in a state in which the relative positions of the photographing apparatus and the object for the calibration pattern are appropriately set as shown in FIG. 9C, or FIGS. 10, 14, 16, 17 described later in detail;

a marker indicating a characteristic point of the image of the calibration pattern displayed in the finder in the state in which the relative positions of the photographing apparatus and the object for the calibration pattern are appropriately set;

a marker indicating a central point of the calibration pattern as shown in FIG. 9A or 4;

a marker indicating a joint between the surfaces of the calibration pattern as shown in FIG. 9E or 7; and a marker indicating arrangement of characteristic surface attribute of the calibration pattern as shown in FIG. 18 described later in detail.

[Second Embodiment]

The present embodiment is an example in which the present invention is applied to the photographing apparatus including displays such as LCD or the so-called electronic finder.

Figure 10:
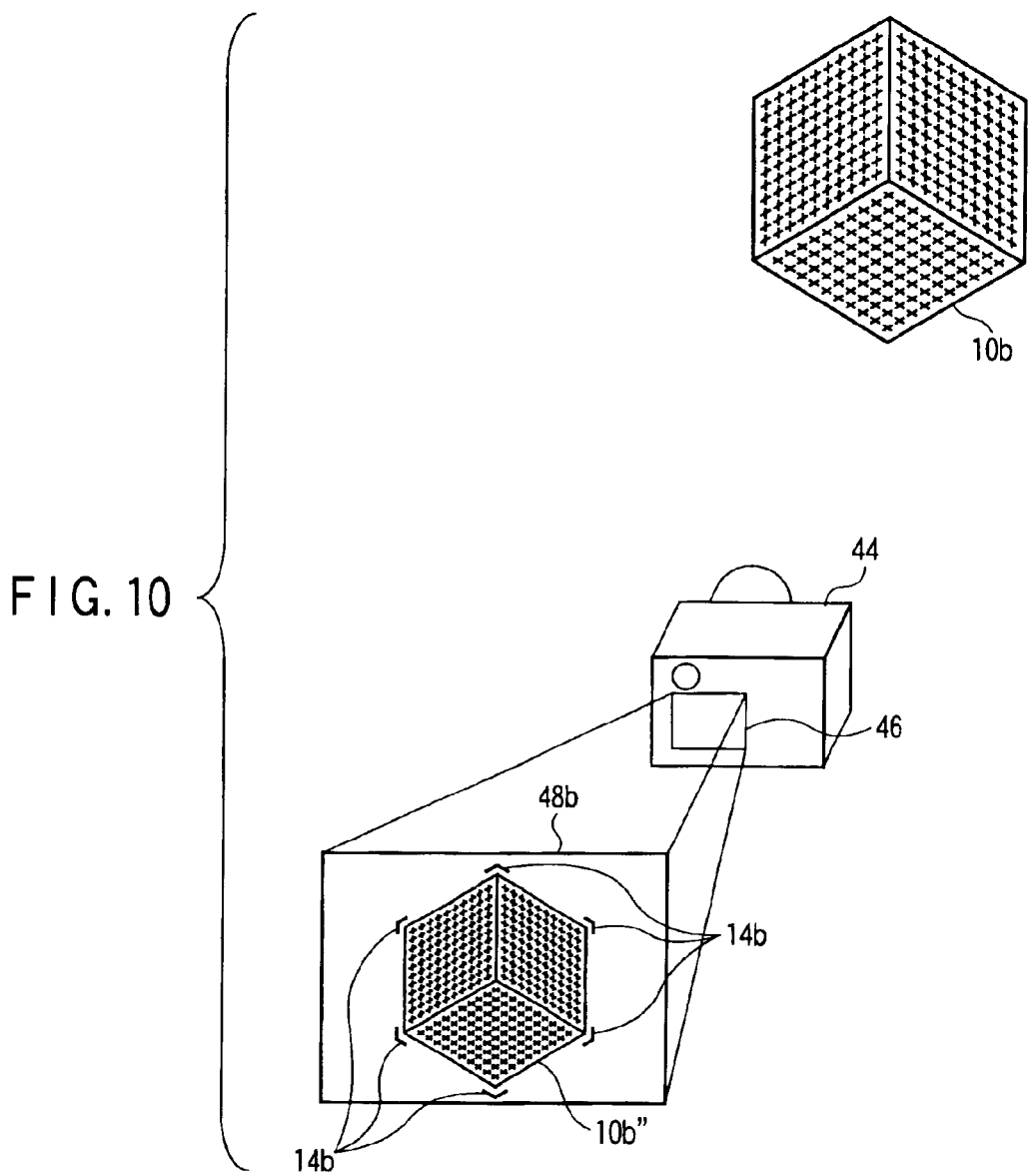
FIG. 10 is a diagram showing a photographing situation of the calibration pattern by a photographing system which is a photographing apparatus according to a second embodiment of the present invention.

As shown in FIG. 10, the markers for positioning (markers for positioning 14b in this example) with respect to the calibration pattern (calibration pattern 10b in this example) are disposed, for example, printed on an electronic finder 46 which is the display of a photographing system 44 which is the photographing apparatus according to the second embodiment. Needless to say, the marker for positioning may also be disposed by the other method described above in the first embodiment.

In this constitution, as described above in the first embodiment, the calibration pattern is photographed so that the image (calibration pattern image 10b'' in this example) of the calibration pattern in an image 48b displayed in the electronic finder 46 is aligned with the marker for positioning disposed on the electronic finder 46. Accordingly, the appropriate calibration pattern is easily photographed.

Moreover, since the image photographed in this manner can be displayed in the electronic finder 46 in the constitution of the present embodiment, it can be judged whether or not the image including the calibration pattern grasped in the appropriate view field of the photographing system has been photographed, before carrying out calculation for acquiring actual parameters.

[Third Embodiment]

The present embodiment is an example in which the marker for positioning is electrically superimposed upon an output image to the electronic finder and output.

Figure 11:
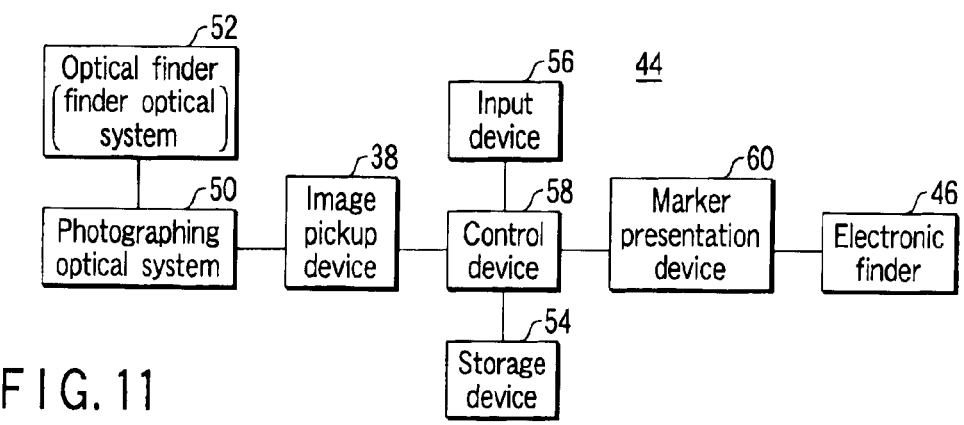
FIG. 11 is a block diagram showing a constitution of the photographing system which is the photographing apparatus according to a third embodiment of the present invention.

As shown in FIG. 11, the photographing system 44 which is the photographing apparatus according to the third embodiment includes a photographing optical system 50, optical finder (finder optical system) 52, image pickup device 38, storage device 54, input device 56, control device 58, and electronic finder 46 which have constitutions similar to those of a general photographing apparatus. Here, the photographing optical system 50 forms the image of a subject in a predetermined position, and the image pickup device 38 converts the subject image formed by the photographing optical system 50 into image data to output the data. The optical finder (finder optical system) 52 presents a photographing range to an operator. The storage device 54 stores image data output from the image pickup device 38. The input device 56 operates the photographing system 44. The control device 58 controls storage or reproduction of the image data with respect to the storage device 54. The electronic finder 46 displays the image data output from the image pickup device 38 or reproduced from the storage device 54 in accordance with the control of the control device 58. Furthermore, in the present embodiment, in addition to these general constitutions, a marker presentation device 60 is included. For the marker presentation device 60, during the photographing of the calibration pattern in which at least one of the size, shape, and surface attribute is known in order to acquire various parameters of the photographing optical system 50, the image of the marker for positioning is electrically drawn/superimposed upon the image data which is output from the image pickup device 38 and which is to be displayed on the electronic finder 46.

In this constitution, when the drawn marker for positioning is used as the clue to photograph the calibration pattern, it is easy to grasp the pattern in an appropriate view field of a camera.

Figure 12:
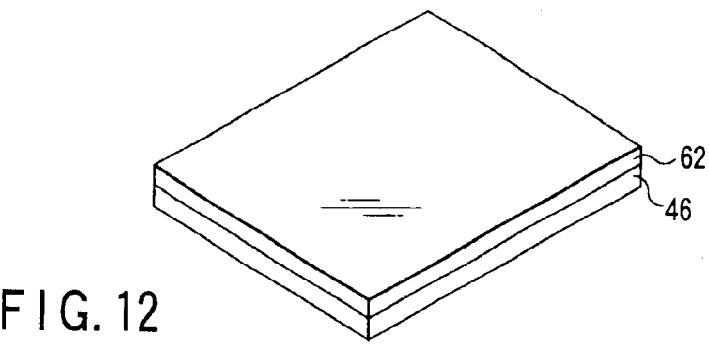
FIG. 12 is an explanatory view concerning a thickness of a protective panel on an electronic finder.

Moreover, when the marker for positioning is disposed on the surface of the electronic finder 46, as shown in FIG. 12, it is proposed that a transmission panel 62 (usually transparent glass or plastic) be disposed in order to protect the electronic finder 46. In this case, because of thickness of the transmission panel 62, the position of the marker for positioning deviates depending on an angle at which the user views the electronic finder 46. However, in the electronic drawing as in the present embodiment, since the deviation is not generated, it is easy to grasp the calibration pattern in a further appropriate view field of the photographing system. It is to be noted that the photographing system 44 may display the image directly in the electronic finder 46 from the image pickup device 38 not via the storage device 54.

[Fourth Embodiment]

In the third embodiment, the marker for positioning is constantly superimposed and constantly displayed by the marker presentation device 60. However, in accordance with a user's desire, that is, the user uses the input device 56 for operation at the time of the photography so that display/non-display of the marker for positioning can be selected.

When the display/non-display of the marker for positioning can be selected in this manner, for example, when it is selected not to display the marker for positioning at the time of the photography not carried out for a purpose of calibration, the marker for positioning can be prevented from constituting any hindrance.

[Fifth Embodiment]

When the transmission type LCD, and the like are used instead of the glass plate 18 in the first embodiment, or when the marker for positioning is displayed in the electronic finder 46 as in the third and fourth embodiments, the display of a marker for positioning 9 may be allowed to blink.

When this blink display is carried out, the marker for positioning is conspicuous, and therefore the positioning is further facilitated. In this case, in the same manner as the presence/absence of the display of the marker for positioning in the fourth embodiment, the presence/absence of this blink display operation can also be selected by the user using the input device 56.

[Sixth Embodiment]

In the fourth embodiment, the user selects the display/non-display of the marker for positioning. However, in the present embodiment, in accordance with switching between a calibration pattern photographing mode and a usual photographing mode, the display/non-display of the marker for positioning is automatically selected, that is, the marker for positioning is not displayed at the time of the usual photographing. It is to be noted that here the usual photographing means the photographing of the object whose shape and surface attribute are unknown and may also include photography for a purpose of acquiring three-dimensional information of the subject, and photography by projection of the pattern onto the subject.

Figure 13:
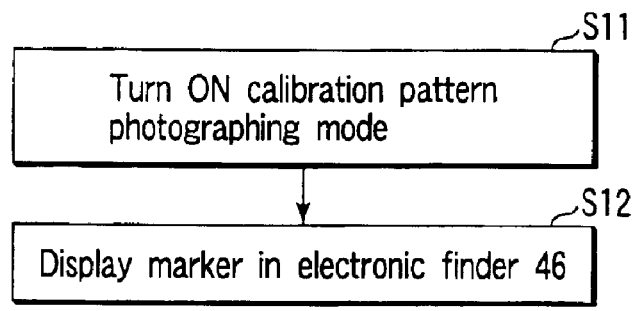
FIG. 13 is a flowchart showing a display operation of the positioning marker in a sixth embodiment of the present invention.

That is, as shown in FIG. 13, when a calibration pattern photographing mode is turned ON (step S11), the marker for positioning 9 is superimposed/displayed upon the electronic finder 46 (step S12).

The switching between the usual photographing mode and the calibration pattern photographing mode may be carried out by the operation of the input device 56, or may automatically be carried out. The automatic switching can be carried out, for example, by automatically judging, by image processing, whether or not the photography is a first photography of the day, the image is recorded in the storage device 54, or the photography is the first photography after an adapter is attached (in an adapter system) (e.g., from contrast or presence of a repeated pattern, it is recognized that the calibration pattern is photographed.

In this constitution, at the time of the usual photographing, the pattern can be photographed without being hindered by the marker for positioning.

[Seventh Embodiment]

In the third embodiment, by the marker presentation device 60, the marker for positioning is constantly superimposed and accordingly constantly displayed. However, when the photographed image stored in the storage device 54 is reproduced and displayed in the electronic finder 46, the marker for positioning may not be displayed. Here, the photographed image is an image once stored after the subject is photographed, and is not synchronized with the image from the image pickup device 38.

That is, when the control device 58 judges that the image is read from the storage device 54, the marker for positioning is not displayed at the time of image confirmation. In this constitution, the marker for positioning does not constitute any hindrance at the time of the image confirmation.

Moreover, when the user uses the electronic finder 46 to confirm the photographed image after the photography, the input device 56 for the operation may also be used to select the display/non-display of the marker for positioning. In this case, the marker for positioning can be displayed only on a necessary image so that the image can be confirmed.

[Eighth Embodiment]

Figure 14:
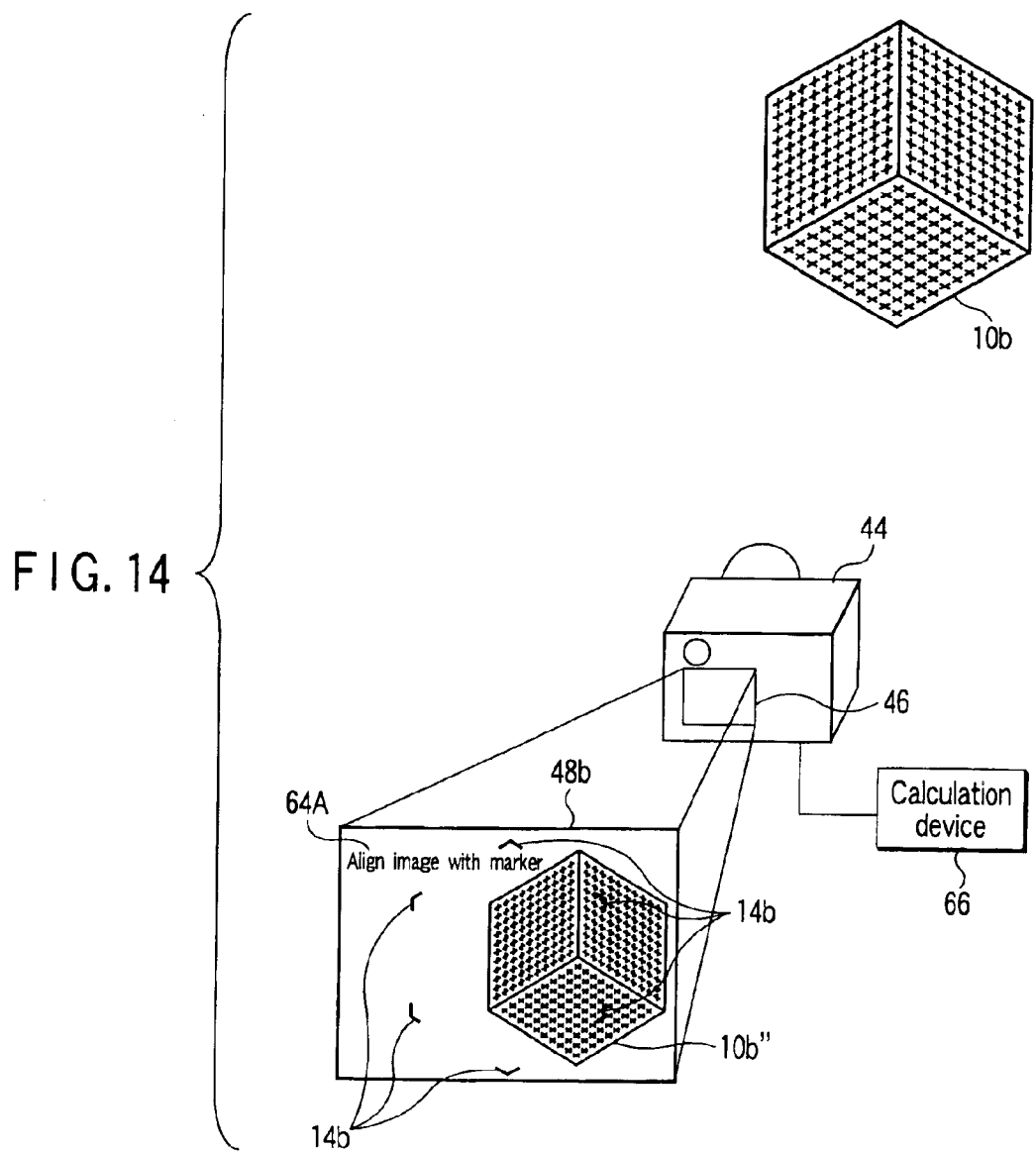
FIG. 14 is a diagram showing the photographing situation of the calibration pattern by the photographing system which is the photographing apparatus according to an eighth embodiment of the present invention.
Figure 15:
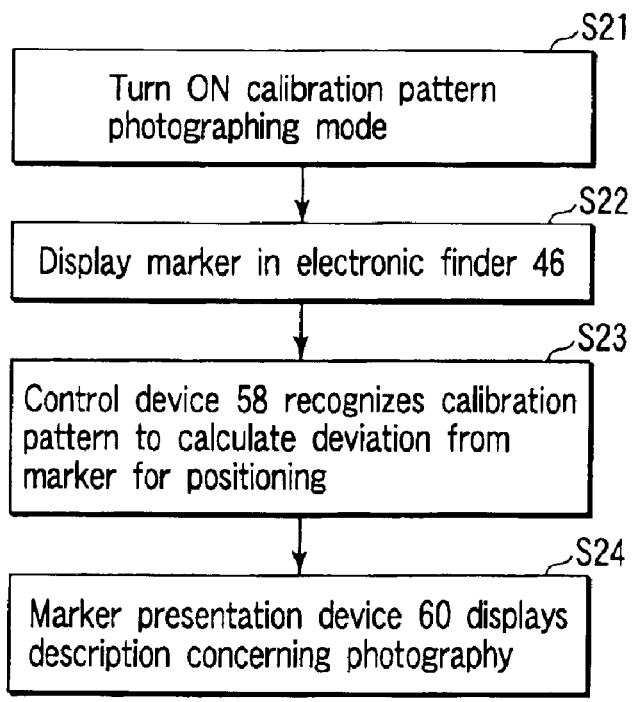
FIG. 15 is a flowchart showing an operation for informing a user of a deviation in the eighth embodiment.

FIG. 14 is a diagram showing the photographing situation of the calibration pattern by the photographing system 44 which is the photographing apparatus according to an eighth embodiment of the present invention, and FIG. 15 is an operation flowchart of the photographing system 44.

That is, when the calibration pattern photographing mode for photographing the calibration pattern (calibration pattern 10b in this example) is turned ON in the photographing system 44 including the electronic finder 46 (step S21), the control device 58 controls the marker presentation device 60 to superimpose/display the marker for positioning (markers for positioning 14b in this example) upon an image 48b displayed in the electronic finder 46 (step S22). Moreover, in the present embodiment, the control device 58 carries out a process of recognizing the calibration pattern from the image 48b to calculate positional deviation between the recognized image of the calibration pattern (calibration pattern image 10b" in this example) and the marker for positioning (step S23). Furthermore, in accordance with the calculation result, description concerning the photography (explanatory note 64A in this example) is superimposed/displayed on the image 48b of the electronic finder 46 (step S24). Examples of the explanatory note 64A include characters indicating a direction for moving the photographing system 44 or the calibration pattern which is the subject or a photographing method. In this constitution, the positioning is further facilitated.

Figure 17:
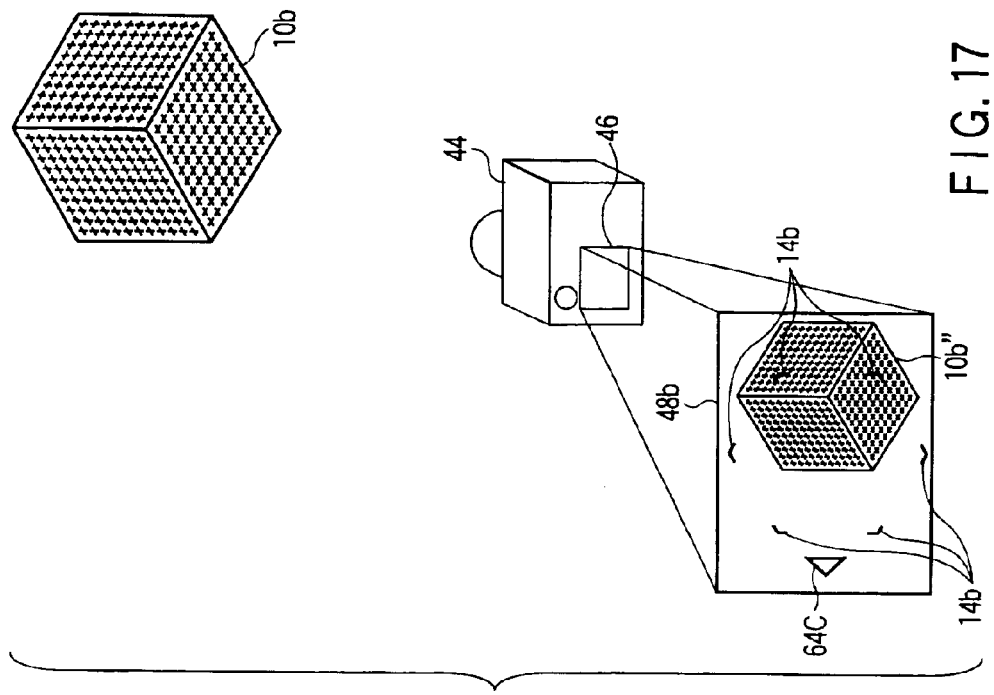
FIG. 17 is a diagram showing the photographing situation showing still another example of the description concerning the photography.
Figure 16:
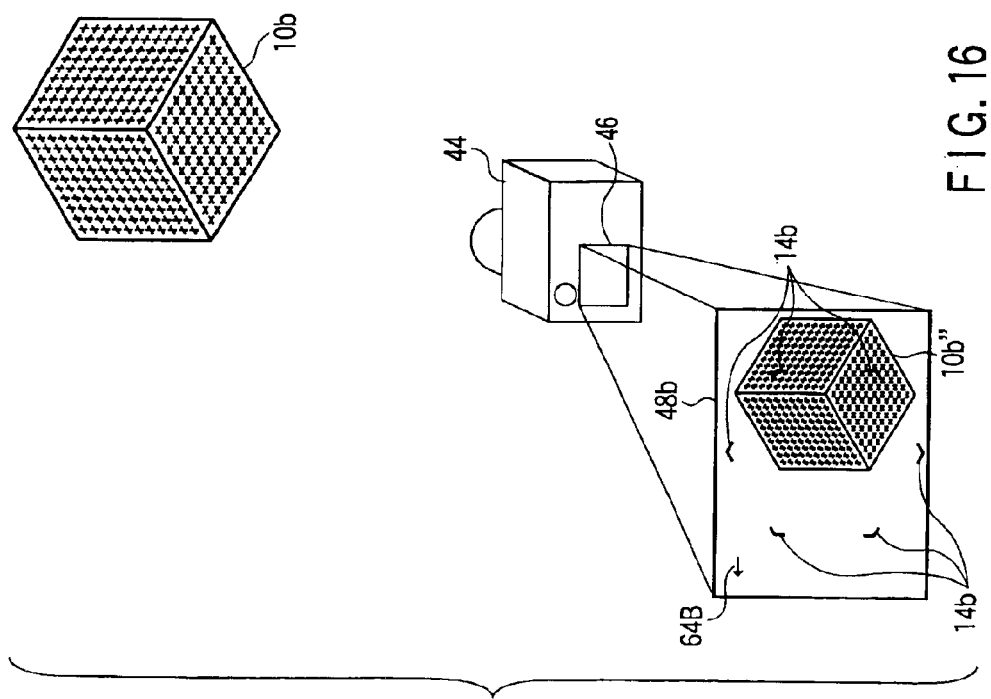
FIG. 16 is a diagram showing the photographing situation showing another example of description concerning photography.

It is to be noted that, needless to say, each constitution of the present embodiment can variously be modified/changed. For example, instead of the control device 58, an external calculation device 66 connected to photographing system 44 as shown in FIG. 14 calculates the positional deviation, and the calculation result may be received by the control device 58 to display the description concerning the photography. Furthermore, the description concerning the photography may also be displayed on a monitor of the photographing system 44 separate from the electronic finder 46 on which the marker for positioning is displayed, or on an external display connected to the photographing system 44. The calculation device 66 may include the monitor to display the description concerning the photography in the monitor. The input device 56 may also be used by the user to select the display/non-display of the description concerning the photography. Furthermore, the user may use the input device 56 to select the display of either one of the marker for positioning and the description concerning the photography. The description concerning the photography is not limited to the explanatory note 64A, and may also be an explanatory symbol 64B or 64C indicating the direction for moving the photographing system 44 or the calibration pattern as shown in FIG. 16 or 17. Furthermore, the description may also be made concerning the photography not only by the character and symbol but also by sound navigation.

[Ninth Embodiment]

A ninth embodiment of the present invention is an example in which an object to be photographed is disposed on the calibration pattern. That is, as shown in FIG. 18, when an object to be photographed O disposed on the calibration pattern (calibration pattern 10c shown in FIG. 3A in this example) is photographed by the photographing system 44 including the electronic finder 46, the markers for positioning (markers for positioning 14c in this example) are electronically superimposed/displayed on an image 48c displayed in the electronic finder 46.

In this constitution, the user uses the superimposed/displayed markers for positioning 14c as the clue to photograph the object. Accordingly, it is easy to grasp the object to be photographed O disposed on the calibration pattern 10c in the appropriate view field of the photographing system. When the object to be photographed O is photographed from multiple directions, circumferential bonding processing is carried out, and it is therefore possible to easily photograph a satisfactory image having no leakage.

[Tenth Embodiment]

The present embodiment is an example in which the marker for positioning is presented to the user, when the object for calibration is photographed by a stereo photographing apparatus. It is to be noted that in the present specification, "the stereo photographing" means the photographing from a plurality of points of sight. Furthermore, the photographing by one photographing apparatus using a stereo converter to obtain the image from the plurality of points of sight, or the photographing by the use of a plurality of photographing apparatuses is also included. The "image obtained by the stereo photographing" means the image from the plurality of points of sight. This also means a plurality of images from a plurality of photographing apparatuses, or one image in which the images from the plurality of points of sight are buried.

Figure 2:
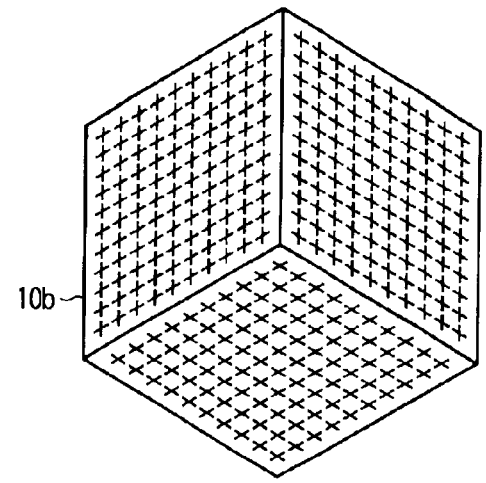
FIG. 2 is a diagram showing another example of the object for the calibration.

Moreover, as a method of acquiring three-dimensional information in non-contact, there is stereo measurement. In this method, the images from different points of sight are acquired, and the three-dimensional information is obtained from a positional relation among the respective points of sight and a difference in a visible way among the respective images. For example, as shown in FIG. 19, a plurality of photographed images 70R, 70L are acquired from a plurality of points of sight (two points in this case) by photographing systems 68L, 68R, and one of the images is obtained as a standard image 72 (the left photographed image 70L in this case). Moreover, from an amount of difference (hereinafter referred to as parallax) between the position of a point A on the object to be photographed O on a coordinate of the standard image 72 and that of the point A on the coordinate of the other photographed image 70R, positions of points of sight, and a sight line direction, a distance to the point A can be calculated based on a principle of triangulation. Usually, when the three-dimensional information is acquired by a stereo image, stereo matching is performed to recognize a point on the other image to which one standard point on one image corresponds by corresponding point search. Even in this case, in order to acquire various parameters required for a correct parallax or triangulation (relation in positions and postures among a plurality of photographing systems in addition to the parameters of a single photographing system (camera)), for example, the calibration pattern 10b shown in FIG. 2 is photographed. In this case, the parameters can also be acquired for parallel projection processing (rectification) of the image.

Figure 20A:
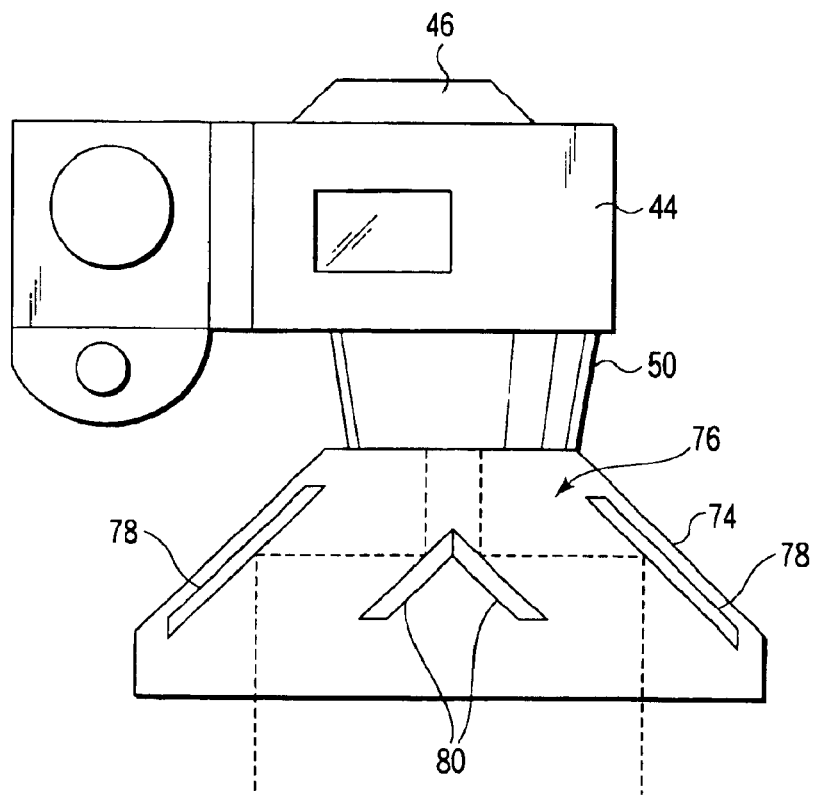
FIG. 20A is an explanatory view of a constitution of an optical path splitting optical system in a stereo adapter.
Figure 20B:
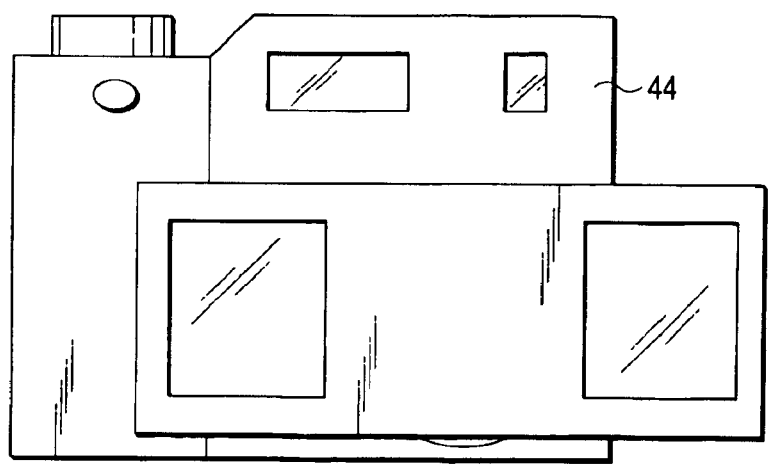
FIG. 20B is a front view of the photographing system including the stereo adapter.

Moreover, as the stereo converter by which the stereo image can be photographed by the photographing system 44 described above, a stereo adapter 74 shown in FIGS. 20A and 20B are known. Here, by the stereo adapter 74, the object to be photographed O is photographed from at least two different points of sight, and an optical path splitting optical system 76 is incorporated. Here, for the optical path splitting optical system 76, the images of the object to be photographed O viewed from a plurality of points of sight are guided into the photographing optical system 50 of the photographing system 44, and accordingly the image of the object to be photographed O from the different points of sight is formed in the image pickup device 38 of the photographing system 44. That is, the optical path splitting optical system 76 includes two light receiving mirrors 78 disposed apart from each other, and two deflecting mirrors 80 disposed before the photographing optical system 50. The image of the object to be photographed reflected by the light receiving mirrors 78 is incident upon the photographing optical system 50 by the deflecting mirrors 80, and the image from two different points of sight can be formed in the image pickup device 38. Accordingly, the stereo image is obtained from the image pickup device 38.

Figure 21:
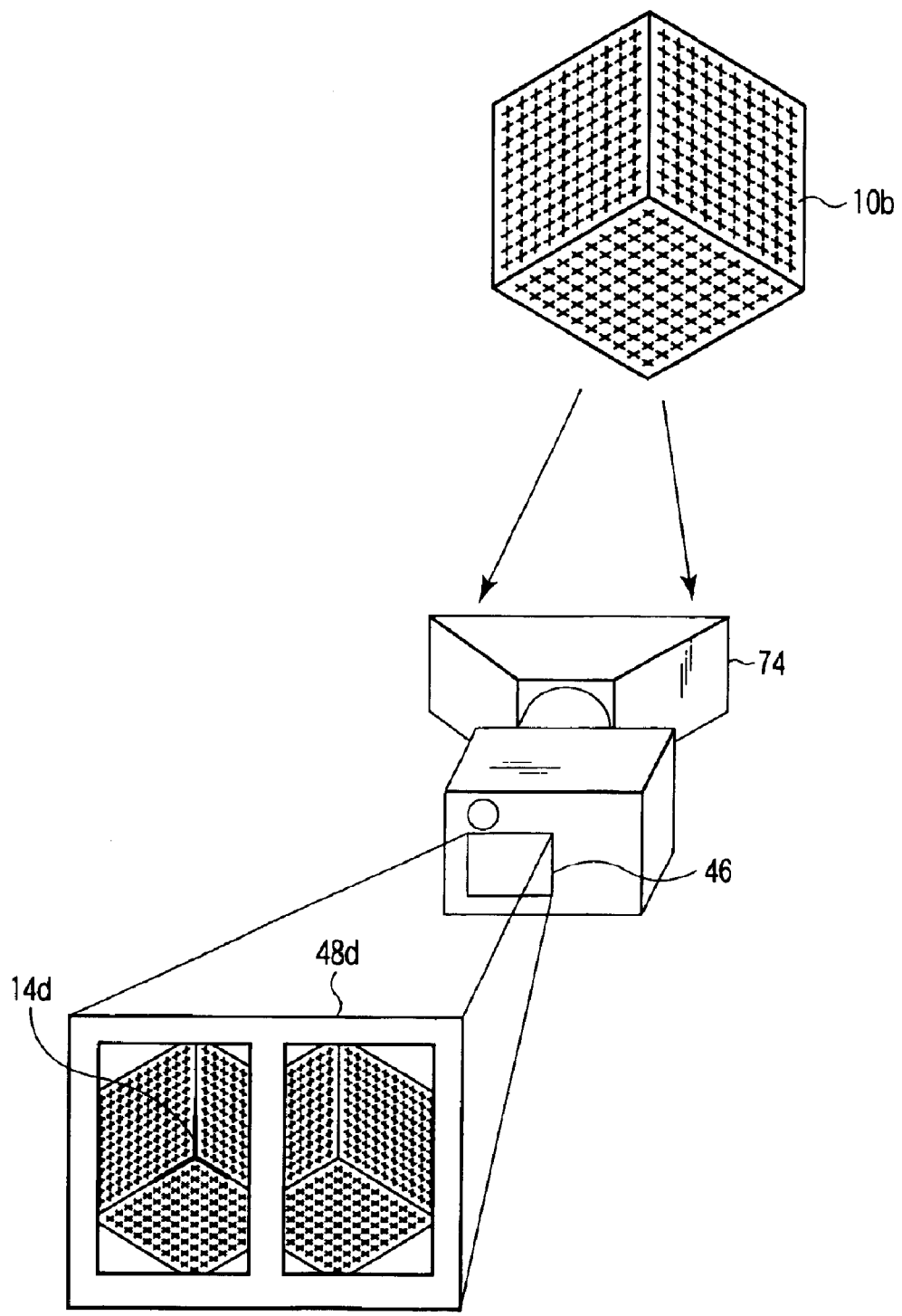
FIG. 21 is a diagram showing the photographing situation of the calibration pattern by the photographing system including the stereo adapter, which is the photographing apparatus according to a tenth embodiment of the present invention.

FIG. 21 is a diagram showing the photographing situation of the calibration pattern by the photographing system 44 which is the photographing apparatus according to the tenth embodiment. That is, to photograph the calibration pattern (calibration pattern 10b in this example) is photographed by the photographing system 44 including the electronic finder 46 to which the stereo adapter 74 for photographing the stereo image has been attached, the marker for positioning (marker for positioning 14d in this example) is electronically superimposed/displayed on a stereo image 48d displayed in the electronic finder 46.

Since the user uses the superimposed/displayed marker for positioning as the clue to photograph the calibration pattern, it is easy to grasp the pattern in the appropriate view field of the photographing system. When the calibration pattern is photographed by the stereo photographing, the present invention can also be applied for acquiring various parameters of the photographing optical system 50 of the photographing system 44.

It is to be noted that, needless to say, each constitution of the embodiment of the present invention can variously be modified/changed. For example, the marker for positioning may also be displayed only in a certain image (e.g., the left-side image) in the left and right images constituting the stereo image 48d as shown in FIG. 21, or may also be displayed with respect to both the images. Not all the photographed stereo images 48d but only one of the left and right images may also be displayed in the electronic finder 46. Furthermore, to photograph the stereo image, instead of using the stereo adapter 74, a plurality of photographing systems 68L, 68R shown in FIG. 19 may also be used.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A finder apparatus which is used together with a photographing apparatus, comprising:
    a finder configured to present an image of a subject so as to be visually recognizable by an operator; and
    positioning marker presentation member configured to present at least one marker for positioning for setting relative positions of the photographing apparatus and an object for calibration to the finder so as to be visually recognizable by the operator, when the object for calibration including at least one of a known shape and a known surface attribute is photographed to acquire a parameter of a photographing optical system of the photographing apparatus, wherein said at least one marker corresponds to one of the known shape and the known surface of the object for calibration.

2. The finder apparatus according to claim 1, wherein the photographing apparatus is a stereo photographing apparatus which photographs the subject from a plurality of points of sight.

3. The finder apparatus according to claim 1, wherein the finder includes an optical finder including a finder optical system configured to form an optical path to guide the image of the subject into operator's eyes.

4. The finder apparatus according to claim 1, wherein the positioning marker presentation member includes:
    marker image production section configured to produce the image of the marker for positioning; and
    image superimposition section configured to superimpose the image of the marker for positioning produced by the marker image production section upon the subject image presented in the finder.

5. The finder apparatus according to claim 1, wherein the photographing apparatus includes an image pickup device configured to convert the subject image formed by the photographing optical system into image data to output the image data, and
    the finder includes an electronic finder configured to display an image obtained by reproduction of the image data output from the image pickup device.

6. The finder apparatus according to claim 5, wherein the positioning marker presentation member superimposes and displays the image of the marker for positioning upon an image corresponding to the subject image displayed in the electronic finder.

7. The finder apparatus according to claim 6, wherein the photographing apparatus further includes storage section configured to store the image data output from the image pickup device as photographed image data, and
    the positioning marker presentation member does not present the marker for positioning, when the image obtained by the reproduction of the photographed image data stored in the storage section is displayed in the electronic finder.

8. The finder apparatus according to claim 6, wherein the photographing apparatus further includes control section configured to calculate a difference between a position of the image of the object for calibration displayed in the electronic finder and that of the marker for positioning, and
    the positioning marker presentation member displays description concerning photography in the electronic finder based on a calculation result in the control section.

9. The finder apparatus according to claim 8, wherein the photographing apparatus further includes input section configured to operate the photographing apparatus, and the positioning marker presentation member switches display and non-display of the description concerning the photography based on information input via the input section.

10. The finder apparatus according to claim 1, wherein the positioning marker presentation member includes one of a member which is analogous to the marker for positioning and a member including the marker for positioning, and the one of the member which is analogous to the marker for positioning and the member including the marker for positioning is disposed on an optical path of a light which guides the image of the subject into the operator's eyes to present the marker for positioning.

11. The finder apparatus according to claim 1, wherein the photographing apparatus further includes input section configured to operate the photographing apparatus, and the positioning marker presentation member switches presentation and non-presentation of the marker for positioning based on the information input via the input section.

12. The finder apparatus according to claim 1, wherein the positioning marker presentation member allows the marker for positioning to blink.

13. The finder apparatus according to claim 1, wherein the positioning marker presentation member does not present the marker for positioning during usual photographing.

14. The finder apparatus according to claim 1, wherein the positioning marker presentation member does not present the marker for positioning during photography for a purpose of obtaining three-dimensional information of the subject.

15. The finder apparatus according to claim 14, wherein the photography for the purpose of obtaining the three-dimensional information of the subject includes photography in which a pattern is projected onto the subject.

16. The finder apparatus according to claim 1, wherein for the marker for positioning, at least one of line segments, intersecting line segments, points, curves, intersecting curves and closed curves are disposed, and accordingly the marker for positioning indicates a closed region corresponding to a contour of the image of the object for calibration presented in the finder in a state in which the relative positions of the photographing apparatus and the object for calibration are appropriately set.

17. The finder apparatus according to claim 16, wherein the marker for positioning indicates at least a corner position of the closed region.

18. The finder apparatus according to claim 16, wherein the marker for positioning surrounds an outer edge of the closed region.

19. The finder apparatus according to claim 1, wherein for the marker for positioning, at least one of line segments, intersecting line segments, points, curves, intersecting curves and closed curves are disposed, and accordingly the marker for positioning indicates a characteristic point of the image of object for calibration presented in the finder in a state in which the relative positions of the photographing apparatus and the object for calibration are appropriately set.

20. The finder apparatus according to claim 19, wherein the characteristic point includes a central point of a pattern of the object for calibration.

21. The finder apparatus according to claim 19, wherein the characteristic point includes a joint between the surfaces of the object for calibration.

22. The finder apparatus according to claim 19, wherein the characteristic point includes an arrangement of characteristic surface attribute of the object for calibration.

23. A marker presentation member comprising one of:

a member through which a visible light is transmitted and on which at least one marker for positioning is partially disposed to set relative positions of a photographing apparatus and an object for calibration including one of a known shape and surface attribute; and a member including the at least one marker for positioning, wherein the one of the member on which the at least one marker for positioning is disposed and the member including the at least one marker for positioning is disposed on an optical path of a light which guides the image of the object for calibration into the operator's eyes, when photographing the object for calibration in order to acquire parameters of a photographing optical system of the photographing apparatus, wherein said at least one marker corresponds to one of the known shape and the known surface of the object for calibration.

24. A method for presenting a marker for positioning for calibration photography, comprising:

presenting an image of an object for calibration in a finder which guides the image photographed by a photographing apparatus into operator's eyes so as to be visually recognizable by an operator, when photographing the object for calibration whose one of shape and surface attribute is known in order to acquire parameters of a photographing optical system of the photographing apparatus; and presenting at least one marker for positioning to set relative positions of the photographing apparatus and the object for calibration in the finder so as to be visually recognizable by the operator, wherein said at least one marker corresponds to one of the known shape and the known surface of the object for calibration.

25. A finder apparatus which is used together with a photographing apparatus, comprising:

a finder for presenting an image of a subject so as to be visually recognizable by an operator; and positioning marker presentation means for presenting at least one marker for positioning for setting relative positions of the photographing apparatus and an object for calibration to the finder so as to be visually recognizable by the operator, when the object for calibration including at least one of a known shape and a known surface attribute is photographed to acquire a parameter of a photographing optical system of the photographing apparatus, wherein said at least one marker corresponds to one of the known shape and the known surface of the object for calibration.

* * * * *